April 3, 1962 — L. R. HEIM — 3,027,590
BEARING AIR-CLEANING APPARATUS
Filed Oct. 6, 1959
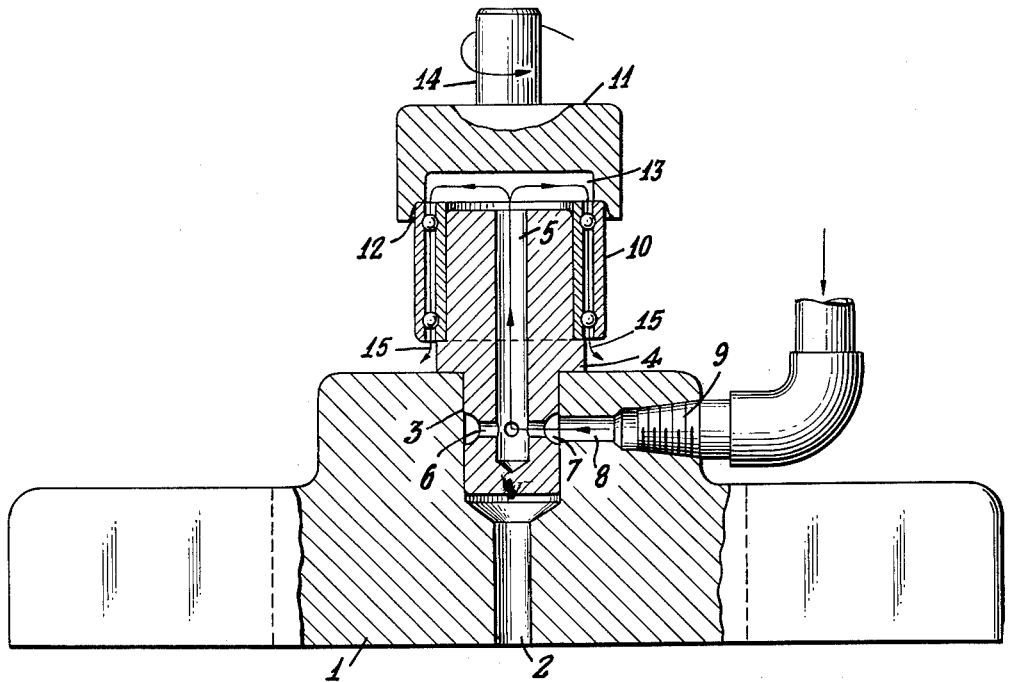
FIG. I.
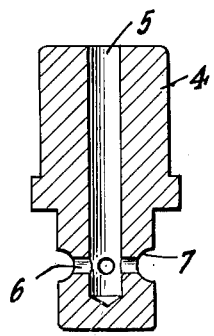
FIG. 2.
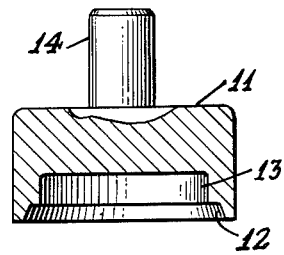
FIG. 3.
INVENTOR.
LEWIS R. HEIM
BY
Davis, Hoxie, Faithfull & Hapgood
ATTORNEYS.

United States Patent Office 3,027,590
Patented Apr. 3, 1962

3,027,590
BEARING AIR-CLEANING APPARATUS
Lewis R. Heim, Fairfield, Conn., assignor, by mesne assignments, to Universal Bearing Corporation, Fairfield, Conn., a corporation of Delaware
Filed Oct. 6, 1959, Ser. No. 844,810
1 Claim. (Cl. 15—304)

This invention relates to apparatus for cleaning antifriction bearings, which commonly gather dust and dirt particles during manufacturing operations. This is especially true when the bearings are heat treated, for during heat treatment the furnace and quenching oil are primary sources of dirt. These particles are harmful if they are permitted to accumulate in the ball races.

The prior art method of cleaning these assemblies involved directing high-pressure air through a small nozzle at the opening between the inner and outer members and moving the nozzle slowly in a circular path around the opening to insure that the concentrated stream of air was directed throughout the entire assembly. This was usually done after the bearings had been washed in solvents to remove dirt-laden grease and oil.

My invention overcomes the inefficiencies of the presently utilized methods by confining the high-pressure air and applying it to the entire space between the members at the same time, while rotating one member with respect to the other to dislodge any dirt trapped behind the rolling elements. Being completely mechanical, my improved cleaning apparatus lends itself readily to inclusion as a step in an automatic production machine.

The invention will now be described in reference to the drawing of which FIG. 1 is a cross-sectional view of my automatic bearing cleaning device;

FIG. 2 is a cross-sectional view of the bearing mount pin; and

FIG. 3 is a cross-sectional view of the bearing chuck.

As shown in FIG. 1 a die shoe 1 is mounted at a point in an automatic bearing-producing machine where there is available a source of rotary motion and high-pressure air. As an alternative the die shoe 1 may be mounted on the bed of a drill press where a source of rotary power is readily available. The shoe is mounted by clamping or bolting it to a table through the mounting hole 2. The shoe is counterbored at 3 to receive the lower end of a flanged mount pin 4. The mount pin 4, as shown in FIG. 2, has a central air passage 5 connected by ducts 6 to an annular groove 7. The groove 7 connects to an air inlet duct 8 in the die shoe, which is in turn connected to a source of high-pressure air 9. The air supply may be controlled by a foot valve or hand valve not shown or it may be connected for automatic operation. The upper end of the mount pin is of suitable diameter to engage snugly the inner walls of the central opening of the bearing 10.

The chuck member 11 is shown in FIG. 3. The opening 12 serves to receive and hold the outer race of the bearing while the opening 13 serves as a plenum chamber for the air supplied through the mount pin.

The bearing is first placed on the mount pin, and the rotating chuck is lowered onto the outside member as shown in FIG. 1 and the shaft 14 of the chuck is connected to a source of rotary motion. When the air is applied in this manner the only avenue of escape is by way of the channel 15 between the inner and outer races causing any loose dirt particles to become dislodged and swept out. Simultaneous rotation of the bearings at high speed by way of the chuck also serves to agitate the particles and to rotate the rolling elements in an attempt to dislodge any particles trapped between the balls and the race. The preliminary step of washing the bearings in solvent may be desirable where any grease or lubricating oil is encountered in the manufacturing process, since deposits of this nature only hinder the removal of dirt.

I claim:

Air-cleaning apparatus for bearing assemblies of the type having an inner race member with a central passageway and an outer race member separated from the inner member by rolling elements, comprising a die shoe, a mount pin supported by said die shoe, said mount pin being adapted to extend into and support said assembly by its central passageway, said mount pin further having an axial air duct adapted for connection to a source of high pressure air, and a capping member adapted to engage only the outer race member connected to a source of rotary motion, said capping member having an opening to receive the outer race member of said assembly and a plenum chamber adapted to communicate with the space between the race members to distribute high pressure air into said space.

References Cited in the file of this patent
UNITED STATES PATENTS

| | | |
|---|---|---|
| 1,766,208 | Anstiss | June 24, 1930 |
| 1,894,786 | Pew | Jan. 17, 1933 |
| 2,549,837 | Merritt | Apr. 24, 1951 |